T. M. RIGGLE & W. M. BAKER.
PNEUMATIC MAIL HANDLING APPARATUS.
APPLICATION FILED JULY 8, 1908.

926,078.

Patented June 22, 1909.
6 SHEETS—SHEET 2.

Witnesses
L. L. Armstrong
E. L. Chandler

Inventors
T. M. Riggle,
W. M. Baker,
By O. T. Richey
Attorneys

THE NORRIS PETERS CO., WASHINGTON, D. C.

T. M. RIGGLE & W. M. BAKER.
PNEUMATIC MAIL HANDLING APPARATUS.
APPLICATION FILED JULY 8, 1908.
926,078.
Patented June 22, 1909.
6 SHEETS—SHEET 3.
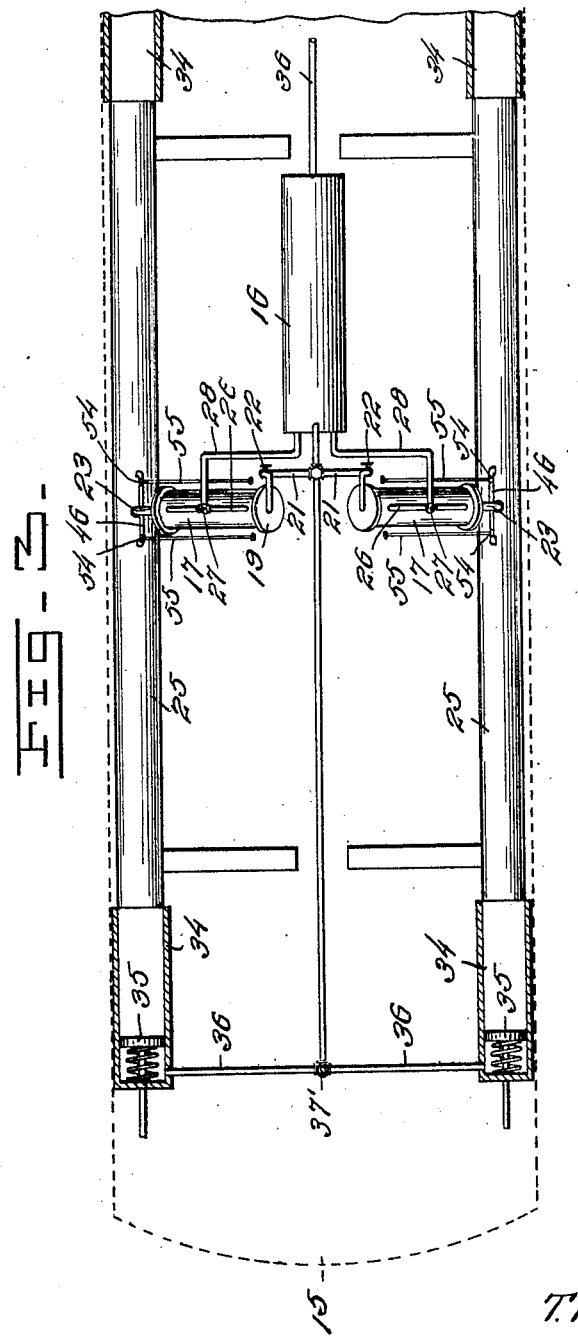
Inventors
T. M. Riggle &
W. M. Baker,
By O. T. Richey
Attorneys
Witnesses

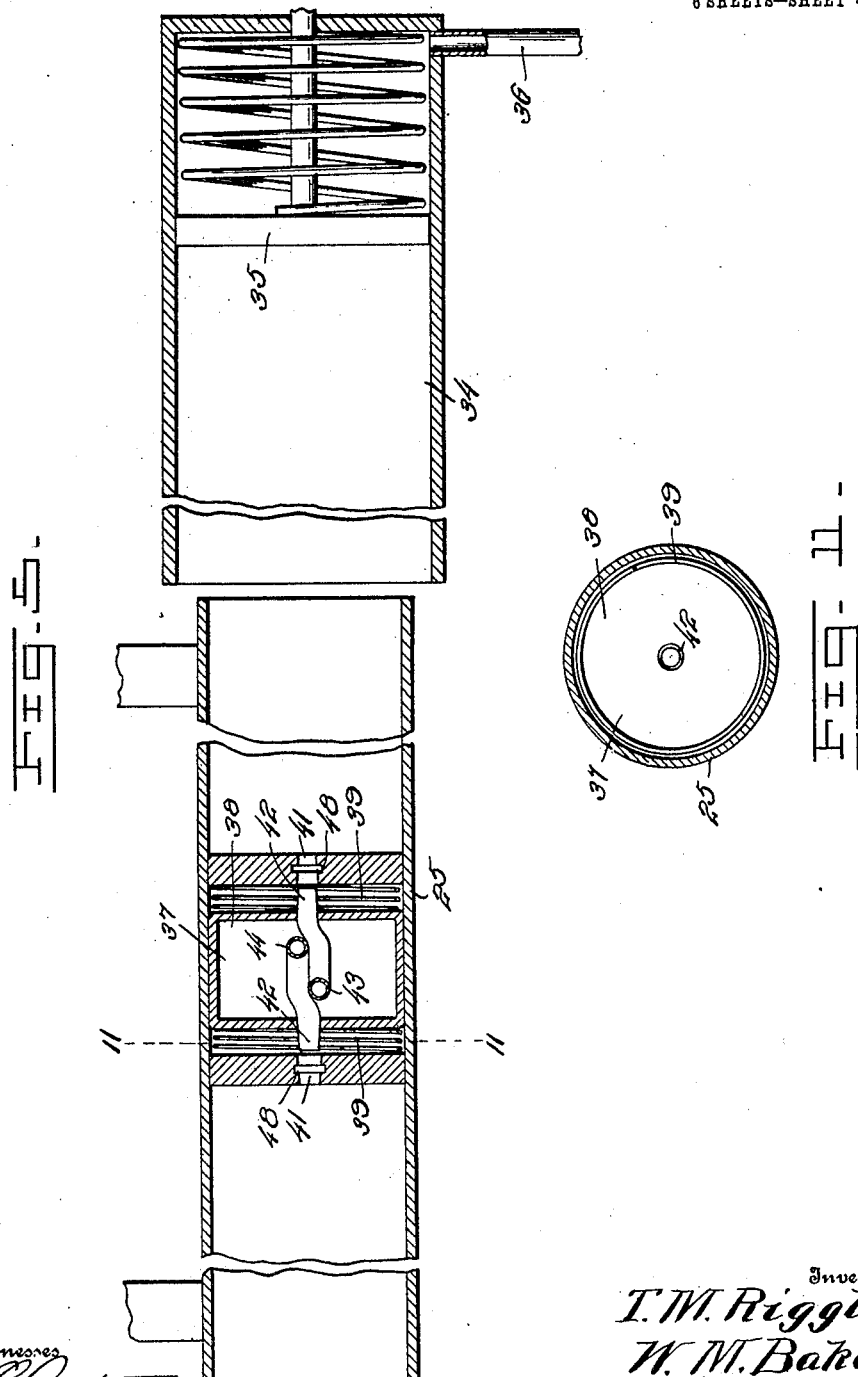

T. M. RIGGLE & W. M. BAKER.
PNEUMATIC MAIL HANDLING APPARATUS.
APPLICATION FILED JULY 8, 1908.

926,078.

Patented June 22, 1909.
6 SHEETS—SHEET 5.

Witnesses
Inventors
T. M. Riggle &
W. M. Baker,
By O. T. Richey
Attorney

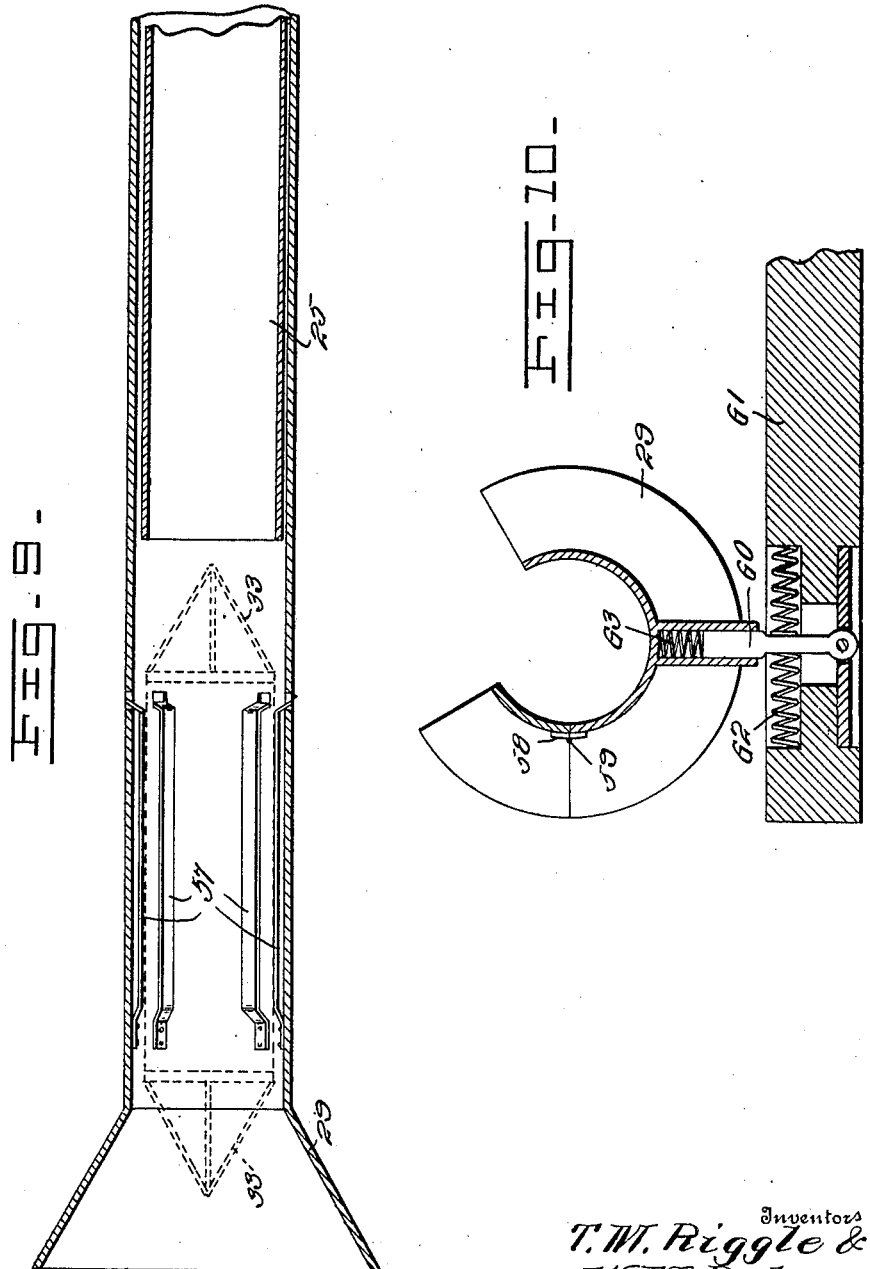

UNITED STATES PATENT OFFICE.

THOMAS M. RIGGLE AND WILLIAM M. BAKER, OF TUCSON, ARIZONA TERRITORY.

PNEUMATIC MAIL-HANDLING APPARATUS.

No. 926,078.   Specification of Letters Patent.   Patented June 22, 1909.

Application filed July 8, 1908. Serial No. 442,531.

*To all whom it may concern:*

Be it known that we, THOMAS M. RIGGLE and WILLIAM M. BAKER, citizens of the United States, residing at Tucson, in the county of Pima and Territory of Arizona, have invented certain new and useful Improvements in Pneumatic Mail-Handling Apparatus, of which the following is a specification.

This invention relates to mail handling apparatus and more particularly to apparatus for the handling of mail receptacles in the delivery and collection of mails from and to moving trains, and has for its object to provide means for quickly and efficiently delivering and collecting mail without the use of bulky and dangerous cranes, catching hooks and similar apparatus which are likely to cause injury to mail clerks, to mail matter, and persons either on the trains, along the tracks, or on the station platforms.

Another object is to provide a structure in which the discharge and collection of the mail containers will be effected by pneumatic action with a minimum of injury to the mail and containers.

Another object is to provide a structure in which the collection of one mail container will automatically operate to eject the container to be delivered.

Other objects and advantages will be apparent from the following description and it will be understood that changes in the specific structure shown and described may be made within the scope of the claims without departing from the spirit of the invention.

Figure 1:
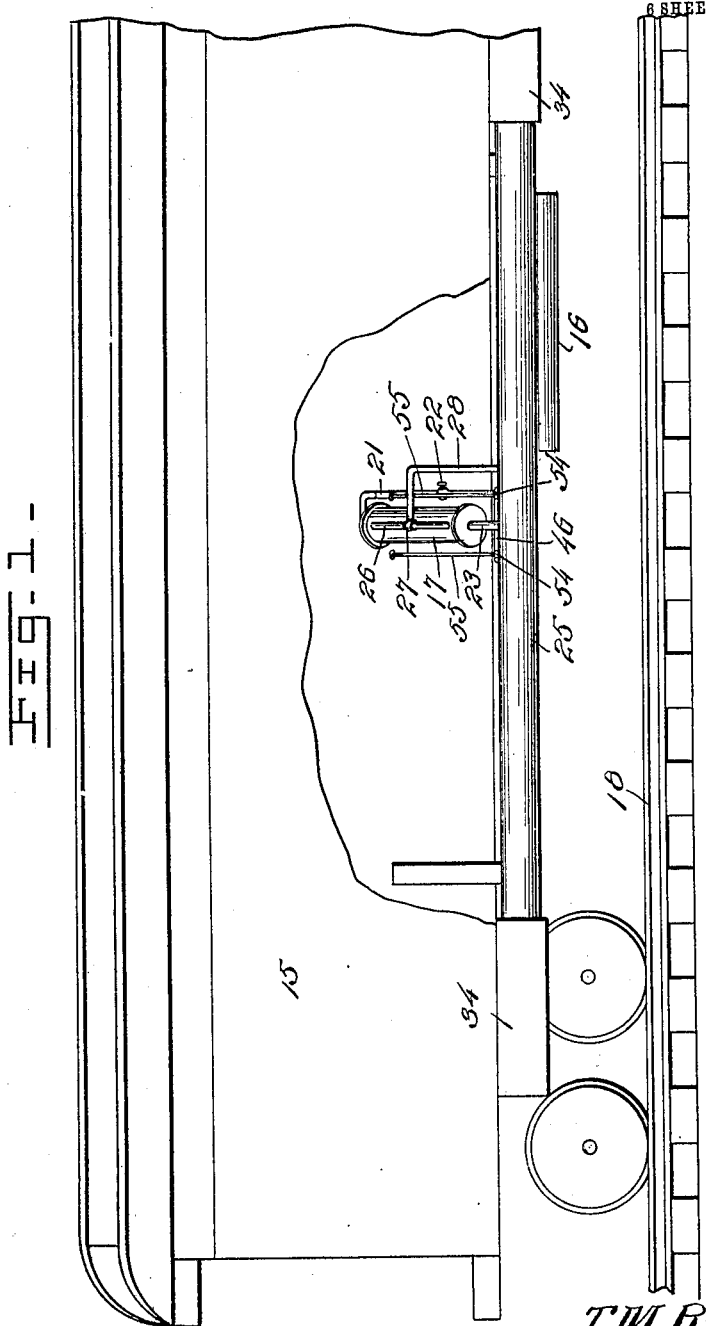
Figure 2:
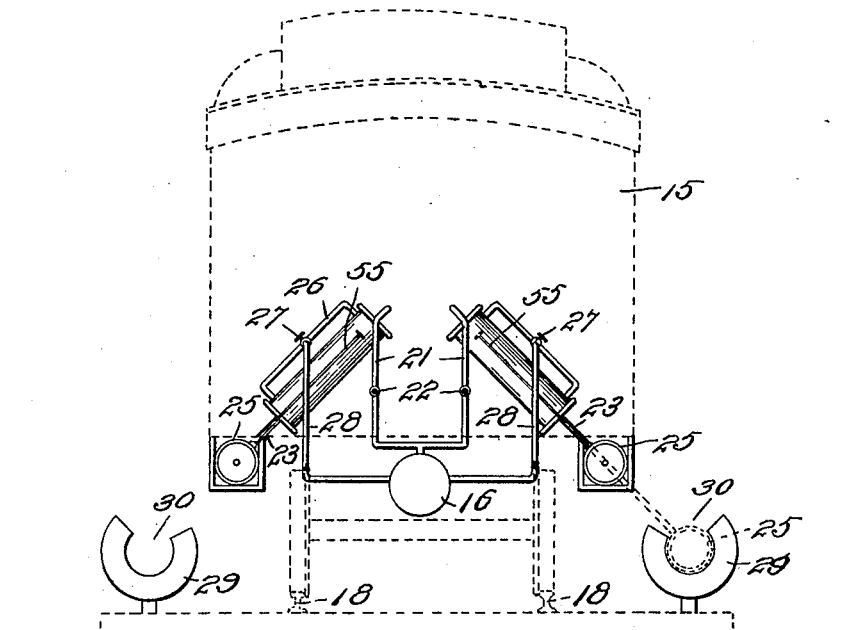
Figure 4:
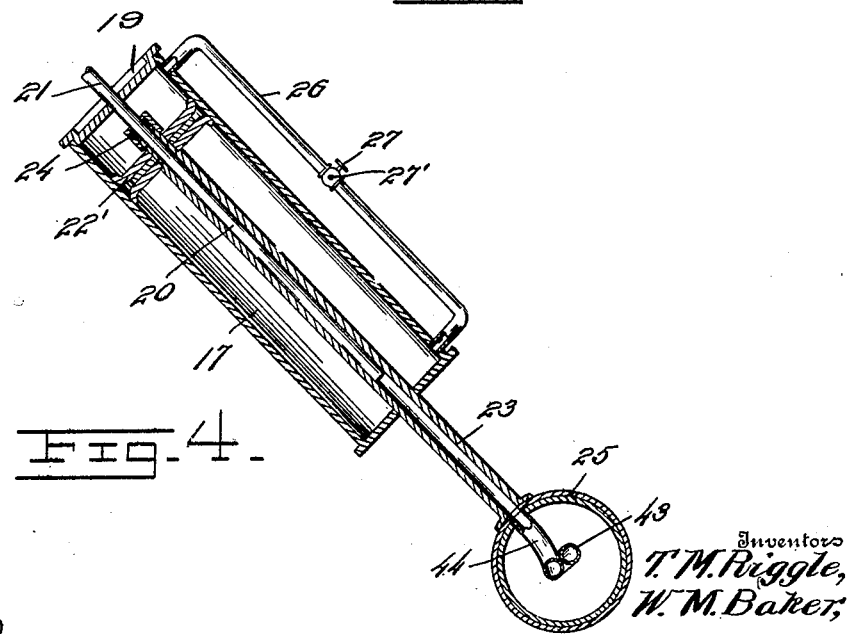
Figure 6:
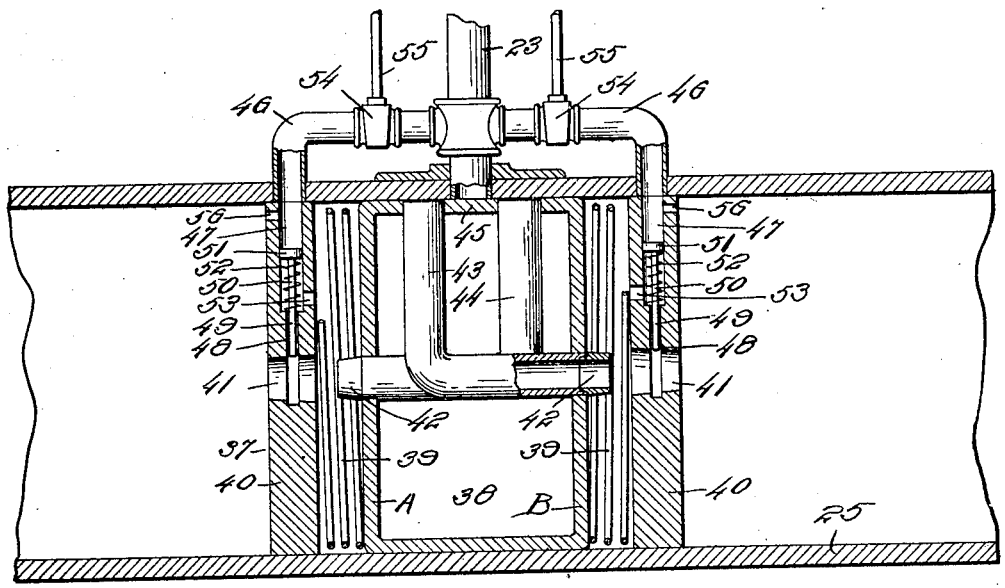
Figure 7:
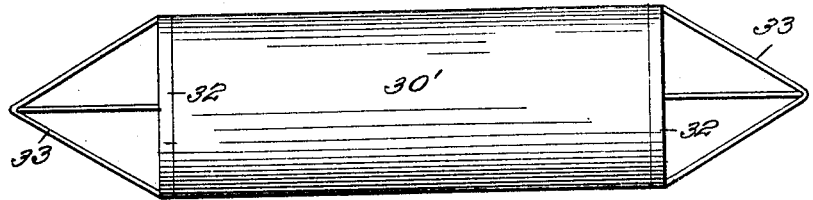
Figure 8:
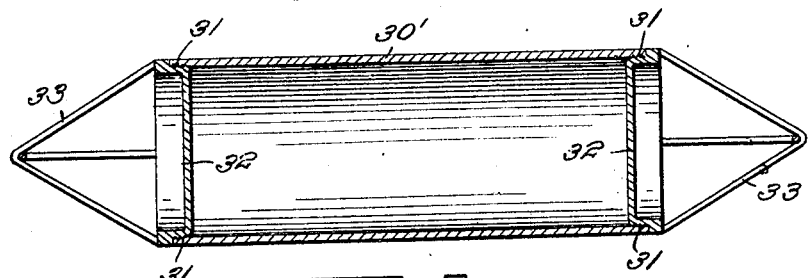

In the drawings forming a portion of this specification and in which like characters of reference indicate similar parts in the several views, Figure 1 is a side elevation of a car, one wall being removed, showing the interior mechanism and the track members. Fig. 2 is a transverse section through a car. Fig. 3 is an enlarged view showing the mechanism within the car in top plan. Fig. 4 is a vertical section through the car mechanism taken on line 4—4 of Fig. 3. Fig. 5 is a longitudinal section through one of the car tubes and the adjacent container pocket. Fig. 6 is an enlarged sectional view of one of the automatic valves. Fig. 7 is an elevational view of one of the mail containers. Fig. 8 is a longitudinal section of the container. Fig. 9 is a longitudinal section of one of the track members with the car tube engaged therein. Fig. 10 is an enlarged view showing one of the cross ties in section and illustrating the mounting of the track members. Fig. 11 is a vertical section on line 11—11 of Fig. 5.

Referring now to the drawings, there is shown a car 15, beneath which there is mounted an air reservoir 16. Within the car, there are mounted a pair of downwardly divergent cylinders 17, the lower ends of which are thus directed outwardly of the track. Each of these cylinders 17 includes an upper head 19, of the usual type, having secured therein a hollow guide rod 20, extending longitudinally of the cylinder therewithin and opening through the outer face of the head 19. Air pipes 21 communicate with these hollow guide rods 20, for the introduction of air therewithin, and the air pipes 21 communicate with the reservoir 16, and are provided with valves 22. Within each of the cylinders 17, there is slidably mounted a piston 22, having a central passage in which the guide rod 20 is slidably received to carry a hollow downwardly extending piston rod 23, in which the guide rod 20 also slides, suitable packing 24 being provided to prevent the leaking of air between the guide rod and piston rod. The piston rods 23 of the two cylinders 17 extend outwardly through the floor of the car 15, and each piston rod carries a car tube 25, extending longitudinally of the car and arranged for movement with the piston rod. Air pipes 26 communicate with the opposite ends of each cylinder, and midway of their ends, the pipes 26 have three way valves 27, to which there are connected air pipes 28, communicating with the reservoir 16. The three way valves 27 may be shifted to admit air alternately at opposite ends of the cylinders 17, and thus the pistons may be moved within the cylinders, to project the car tubes 25 downwardly or to raise them. It will of course be understood that escape holes 27' are formed in the valves 27, to permit of the exhaust of air from the opposite end of the cylinder to that at which air is admitted.

At the side of the railroad track indicated at 18, there is disposed a longitudinally extending track member 29, of tubular form, provided with a longitudinal opening at its upper inner portion, as indicated at 30. These track members 29 are arranged to receive the car tubes 25 therewithin, and the movement of these car tubes, through the medium of the pistons 23 is such as to bring them into and out of position for engagement into and passage through the track members. The track members and car tubes are arranged to receive cylindrical containers 30′, these containers having threaded openings 31 at their ends, receiving screw caps 32, provided with outwardly extending V shaped yokes 33 which give the mail containers the effect of a taper at each end. These yokes also facilitate the unfastening of the caps, as they are arranged to permit of the engagement of a bar or other instrument in the yokes, so that the caps may be easily unscrewed.

At each end of each of the car tubes 25, when the latter are in inoperative position beneath the floor of the car, there is a mail container pocket 34, arranged for the reception of one of the mail containers 30′. Pneumatically operated ejecting pistons 35 are mounted in the pockets 34, and pipes 36 communicate with the pockets and with the reservior 16, and are provided with valves 37′, controlling the admission of air to the pocket. The mail container to be delivered is disposed in one of the pockets 34, which registers with the end of one of the car tubes 25, and air is then admitted behind the pistons 35, which are moved to force the mail container into the tube 25.

At the point of communication of the piston rods 23 with the car tube 25, there is in each car tube, an automatic valve 37. These valves are arranged to normally close the lower ends of the hollow piston rods 23, which communicate with the interiors of the car tubes, as shown. The valves 37 consist each of a disk 38 mounted within the car tubes, for sliding movement, this movement being retarded by helical springs 39, disposed one against each end face of the disk and resting between these faces and partitions 40 located within the car tubes at opposite sides of the disk and in spaced relation thereto. These partitions 40 are provided with central openings 41, which are tapered outwardly, and which are arranged for the reception of similarly tapered nipples 42, carried by the disk 38 centrally of its end faces. One of these end faces of the disk is indicated at A and the other is indicated at B, for convenience in the following description. Vertical passages 43 and 44 are formed in the disk 38 and open through its upper portion the passage 44 being located adjacent to the face B of the disk, while the passage 43 is located adjacent to the face A of the disk. The passage 44 communicates with the nipple 42 which projects from the face A of the disk, while the passage 43 communicates with the nipple 42 which projects beyond the face B of the disk. The two passages are of course turned to extend horizontally at their lower portions, and thus cross each other. The distance between the upper ends of the passages 43 and 44 is sufficient to allow a solid portion 45 of the disk to cover and close the lower end of the piston rod 23, thus preventing the escape of air into the car tube as will be understood. It will be seen, however, that the springs 39 permit movement of the disks 38 to register the passages 43 and 44 interchangeably with the lower end of the piston rod 23, for the free passage of air through these passages. It will also be observed that when the passage 43 is in registration with the lower end of the piston rod, the nipple 42 with which the passage 43 communicates will be engaged in the opening 41 of the adjacent partition 40 so that air from the piston rod 23 will be admitted to one end of the car tube.

As stated in the foregoing, a mail container to be delivered is disposed in one end of one of the car tubes, and this tube is then lowered into position for passage into a track member at a station which the train may be approaching. The mail container has been disposed within the rearward end of the car tube, which is the end toward the rear of the train, and a mail container to be collected has been disposed in one of the track members at the station approached. This mail container in the track member is disposed in the forward end thereof, which is the end farthest from the approaching train. When the car tube passes into the track member, the mail container within the track member is received into the forward end of the car tube, which compresses the air between the received container and the forward partition 40 within the car tube, this air being forced into the space between the partition and the forward face B of the disk 38. The compression of air moves the disk rearwardly against the action of the rearward springs 39, registering the passage 44 with the lower end of the piston rod 23, and permitting the passage of air from the reservoir 16 into the rearward portion of the car tube, this air thus ejecting the mail container to be delivered from the car tube.

A mechanism is provided to effect the movement of the disk 38 should the compression of air caused by the collection of the container from the track member be insufficient to move the disk, and this mechanism includes a pair of pipes 46 extending oppositely from the piston rod 23, and having their outer ends turned downwardly and communicating with vertical chambers 47 formed in the upper portions of the partitions 40. Guide slots 48 communicate with the lower ends of the chambers 47, and extend downwardly through the sides of the passages 41, these guide slots receiving slides 49, which carry upwardly extending stems 50, provided with pistons 51 at their upper extremities. These stems have helical springs 52 engaged therewith between the lower ends of the chambers 47 and the pistons 51. The pistons are thus held yieldably against downward movement and with the slides 49 out of position to close the openings 41. Ports 53 communicate with the lower portions of the chambers 47, and open through the inner faces of the partitions 40, and thus air may be allowed to pass from the chambers 47 through the spaces between the partitions 40 and the disk 38. Valves 54 are provided for the pipes 46, and have valve stems 55, extended upwardly to the interior of the car. Exhaust ports 56 communicate with the upper portions of the chambers 47, and open through the outer faces of the partitions 40. It will thus be seen that when one of the valves 54 is opened, air will be admitted to the chamber 47 with which one of the pipes communicates, and the piston 51 will be moved downwardly to bring the slide 49 into position to close the opening 41. When the slide has been brought into this position, the passage 53 will be opened, and the air will then pass into the space between the partition 40 and the disk 38, moving the disk in the manner described above when the mail container is collected. It will be understood that this mechanism is only used when the rate of travel of the train is so low that the pressure or air caused by collection of the mail container is insufficient to operate the valve.

As shown, the track members are provided with friction springs 57 therewithin, which engage the mail containers and hold them in position, and portions of the track members are hinged for movement to permit of withdrawal of mail containers therefrom. Suitable locks are provided to prevent movement of these hinged portions, the locks being indicated at 58, and the hinged portions being indicated at 59.

The track members are mounted upon stems 60, which are pivoted in cross ties 61 for movement longitudinally of the cross ties, and this movement of the stem is retarded by helical spring 62. The track members are also movable vertically upon their stems, but are held yieldably against such movement by springs 63. The track members are thus movable to conform to any movement of the train during collection or discharge of the mail, and it is understood that this device may be used for handling matter other than that specified.

What is claimed is:

1. A mail handling apparatus comprising two members one movable through the other, one of said members being arranged for the reception of mail to be delivered, and means for admitting fluid under pressure to the said member to force the mail therefrom.

2. In an apparatus of the class described the combination with a cylinder, of a hollow guide rod within the cylinder, a piston movable upon the guide rod, a hollow piston rod carried by the piston and communicating with the interior of the guide rod, a tube connected with the piston rod and arranged to receive a mail container, said piston rod communicating with the interior of the tube, and fluid conducting means communicating with the interior of the hollow guide rod.

3. In an apparatus of the class described, the combination with telescopic hollow rods, of a tube connected with one of said rods, said rods communicating with the interior of the tube, and means for admitting fluid under pressure through the tubes.

4. In an apparatus of the class described, the combination with a tube arranged to receive a mail container, of means for admitting fluid under pressure to the tube, and a valve in the tube, said valve being arranged to control the admission of air to the tubes and means constructed and arranged for operation by air pressure in one end of the tube to admit air to the opposite end of the tube.

5. A mail handling device comprising a tubular body portion, open throughout its entire length on one side, and including a hinged section, said body portion being arranged for the reception of mail containers, said hinged section being movable into and out of position to permit the passage of mail containers into and out of the body portion.

6. In an apparatus of the class described, the combination with a tube arranged for the reception of mail containers in its end portions, of a fluid pressure pipe communicating with the interior of the tube, and a controlling valve for the pressure tube, said valve being arranged for automatic operation to admit of the passage of fluid from the pressure pipe to one end of the tube, to eject a mail container, when a mail container is received into the other end of the tube.

7. In an apparatus of the class described, the combination with a tube arranged to receive mail containers, of means for automatically ejecting a mail container from the tube, said means being arranged for actuation by a container received in one end of the tube to eject a container from the other end of the tube.

8. A delivering and receiving member for mail handling apparatus, comprising a tube, a fluid pressure pipe communicating with the tube, a body located within the tube, and having spaced passages opening through the space adjacent to the pressure pipe and through the side faces of the body, partitions disposed in the tube at opposite sides of the body, springs arranged between the partitions and the body, said springs being disposed to hold the body yieldably against movement and with a solid portion in position to close the pressure pipe, said partitions having openings therethrough, and nipples carried by the body and arranged for introduction into the openings of the partitions, said nipples communicating respectively with the passages of the body farthest from the faces beyond which the nipples project.

9. A delivering and receiving member for mail handling apparatus, comprising a tube, a fluid pressure pipe communicating with the tube, a body located within the tube, and having spaced passages opening through the space adjacent to the pressure pipe and through the side faces of the body, partitions disposed in the tube at opposite sides of the body, springs arranged between the partitions and the body, said springs being disposed to hold the body yieldably against movement and with a solid portion in position to close the pressure pipe, said partitions having openings therethrough, nipples carried by the body and arranged for introduction into the openings of the partitions, said nipples communicating with the passages of the body farthest from the faces beyond which the nipples project, means for closing the openings of the partitions at times and means for conducting fluid under pressure to the spaces between the partition and the body, said opening and closing means being arranged for operation by said fluid.

10. An automatic valve for pneumatic mail handling apparatus comprising a movable body having fluid passages formed therethrough partitions disposed at the opposite sides of the body, said partitions being provided with openings, and springs arranged between the partitions and the body to hold the body yieldably against movement.

11. A valve for pneumatic mail handling apparatus comprising a casing, an inlet pipe communicating with said casing, a valve body movably disposed within the casing, said valve body having spaced passages arranged for alternate registration with the inlet pipe, said body having a solid portion arranged to lie at times in position to close the inlet pipe and means for holding the body normally with its solid portion in position to close the inlet pipe.

12. The combination with a railroad car, of mail container receptacle located beneath the floor of the car for movement into and out of position to receive a container from the receptacle, and pneumatic means for moving a container from the receptacle into the tube.

In testimony whereof we affix our signatures, in presence of two witnesses.

THOMAS M. RIGGLE.
WILLIAM M. BAKER.

Witnesses:
L. J. BOUDREAUX,
EDWIN F. JONES.